United States Patent
Kwon et al.

(10) Patent No.: US 9,029,486 B2
(45) Date of Patent: May 12, 2015

(54) SUPPORTED METALLOCENE CATALYST, METHOD FOR PREPARING THE SAME AND METHOD FOR PREPARING POLYOLEFIN USING THE SAME

(75) Inventors: Hyuck-Ju Kwon, Jeollanam-do (KR); San-Ak Hwang, Jeollanam-do (KR); Dong-Gil Lee, Daejeon (KR); Churl-Young Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/583,180

(22) PCT Filed: Mar. 8, 2011

(86) PCT No.: PCT/KR2011/001591
§ 371 (c)(1),
(2), (4) Date: Sep. 6, 2012

(87) PCT Pub. No.: WO2011/111980
PCT Pub. Date: Sep. 15, 2011

(65) Prior Publication Data
US 2012/0329966 A1 Dec. 27, 2012

(30) Foreign Application Priority Data

Mar. 8, 2010 (KR) .................. 10-2010-0020351
Mar. 8, 2010 (KR) .................. 10-2010-0020352
Mar. 24, 2010 (KR) .................. 10-2010-0026075

(51) Int. Cl.
| | |
|---|---|
| C08F 4/642 | (2006.01) |
| C08F 4/643 | (2006.01) |
| C08F 4/6592 | (2006.01) |
| C08F 110/02 | (2006.01) |
| C08F 4/659 | (2006.01) |
| C08F 10/00 | (2006.01) |

(52) U.S. Cl.
CPC ......... C08F 4/65922 (2013.01); C08F 4/65916 (2013.01); C08F 4/65927 (2013.01); C08F 4/65908 (2013.01); C08F 4/65912 (2013.01); C08F 4/65925 (2013.01); C08F 10/00 (2013.01); C08F 110/02 (2013.01)

(58) Field of Classification Search
CPC ............. C08F 4/65908; C08F 4/65912; C08F 4/6592; C08F 4/65925; C08F 4/65927

USPC .................. 502/103, 104, 120, 128, 152
See application file for complete search history.

(56) References Cited

U.S. PATENT DOCUMENTS

| | | | |
|---|---|---|---|
| 5,324,800 A | 6/1994 | Welborn, Jr. et al. | |
| 6,207,606 B1 | 3/2001 | Lue et al. | |
| 7,294,600 B2 * | 11/2007 | Lee et al. | .............. 502/113 |
| 2006/0116490 A1 | 6/2006 | Paczkowski et al. | |

FOREIGN PATENT DOCUMENTS

| | | |
|---|---|---|
| CN | 1697843 A | 11/2005 |
| JP | 06-056928 | 3/1994 |
| JP | 1995-196722 | 8/1995 |
| JP | 07196722 A * | 8/1995 |
| JP | 2006-509904 | 3/2006 |
| JP | 2007-519781 | 7/2007 |
| JP | 2008-121027 A | 5/2008 |
| JP | 2008-530298 | 8/2008 |
| KR | 10-2001-0081727 | 8/2001 |
| KR | 10-2004-0085650 A | 10/2004 |
| KR | 10-2006-0087890 A | 8/2006 |
| KR | 10-2009-0063799 A | 6/2009 |
| WO | WO 02/40549 A2 | 5/2002 |
| WO | 2006-025709 | 3/2006 |
| WO | 2008-042059 | 4/2008 |

OTHER PUBLICATIONS

Marques, M. D. F. V. et al., Binary Metallocene Supported Catalyst for Propylene Polymerization. In: Eur. Poly. J., 2003, vol. 39, pp. 561-567.
Maria de Fatima V. Marques et al., Binary Metallocene Supported Catalyst for Propylene Polymerization, European Polymer Journal 39, 2003; pp. 561-567.

* cited by examiner

*Primary Examiner* — Caixia Lu
(74) *Attorney, Agent, or Firm* — McKenna Long & Aldridge LLP

(57) ABSTRACT

Provided are a supported metallocene catalyst, a method for preparing the same and a method for preparing polyolefin using the same. The supported metallocene catalyst prepared by incorporating a metallocene compound having a ligand substituted with alkoxide or aryloxide into a conventional supported metallocene catalyst and incorporating a borate compound as a second co-catalyst exhibits considerably superior catalyst activity and easily controls molecular weight distribution, as compared to the conventional metallocene-supported catalyst.

12 Claims, No Drawings

SUPPORTED METALLOCENE CATALYST, METHOD FOR PREPARING THE SAME AND METHOD FOR PREPARING POLYOLEFIN USING THE SAME

This application is a National Stage Entry of International Application No. PCT/KR2011/001591, filed Mar. 8, 2011, and claims the benefit of Korean Application Nos. 10-2010-0020351, filed on Mar. 8, 2010, 10-2010-0020352, filed on Mar. 8, 2010, and 10- 2010-0026075, filed on Mar. 24, 2010, which are hereby incorporated by reference in their entirety for all purposes as if fully set forth herein.

TECHNICAL FIELD

The present invention relates to a supported metallocene catalyst. More specifically, the present invention relates to a highly active supported metallocene catalyst, a method for preparing the same and a method for preparing polyolefin using the same.

BACKGROUND ART

In 1976, professor Kaminsky of Germany reported olefin olefin polymerization using a methylaluminoxane (MAO) compound obtained through partial hydrolysis of trimethyl aluminum as a co-catalyst and a zirconocene dichloride compound as a catalyst (A. Anderson, J. G. Corde, J. Herwig, W. Kaminsky, A. Merck, R. Mottweiler, J. Pein, H. Sinn, and H. J. Vollmer, Angew. Chem. Int. Ed. Engl., 15, 630, 1976).

Later, Exxon filed a patent regarding olefin polymerization using a metallocene compound having a variety of substituents in a cyclopentadienyl ligand (U.S. Pat. No. 5,324,800).

Such a metallocene catalyst has a homogeneous active site, thus advantageously causing a narrow molecular weight distribution of polymers, securing easy copolymerization and homogeneous distribution of second monomers, and enabling control of the steric conformation of polymers during propylene polymerization. In particular, only isotactic polypropylene can be prepared by using conventional Ziegler-Natta catalysts, while various polypropylenes such as isotactic, syndiotactic, atactic and hemiisotactic polypropylenes can be stereoregularly prepared by using metallocene catalysts. For example, syndiotactic polypropylene synthesized using metallocene has a low crystallinity, proper rigidity and hardness, excellent transparency and high impact resistance. That is, metallocene catalysts are actively researched, since they have advantages of enabling steric control in the process of preparing polyolefins and facilitating control of physical properties of polymers.

However, olefin polymerization using such a homogeneous catalyst has disadvantages of difficulty in maintaining the form of polymers in the case of a gas phase process or a slurry phase process and of the necessity of excess MAO in order to maximize the activity of metallocene catalysts. In order to solve these disadvantages, metallocene catalysts should be used in a state where they are supported on a proper carrier. Such a supported metallocene catalyst can advantageously control the form of prepared polymers, control the molecular weight distribution depending on the intended use, improve the apparent density of obtained polymers and reduce a fouling phenomenon in a reactor.

Known general methods for preparing a supported metallocene catalyst are a method for preparing a supported metallocene catalyst by physically and chemically bonding a metallocene compound to a carrier and coming the bonded compound into contact with aluminoxane; a method for preparing a supported metallocene catalyst by supporting aluminoxane on a carrier, followed by reaction with a metallocene compound; and a method for preparing a supported metallocene catalyst by bringing a metallocene compound into contact with aluminoxane and then supporting the resulting compound on a carrier. Such a supported catalyst should maintain a single active site catalyst structure even after the supporting process so that it can exhibit high activity and copolymerization efficiency, comparable to a homogeneous catalyst, and it should not be separated from the carrier in the polymerization process in order to prevent fouling in the reactor. Further, the particle size, size distribution and apparent density of polymers depend on particle shape and mechanical properties of supported catalyst.

Korean Patent No. 0404780 discloses a metallocene compound having a silacycloalkyl substitutent and a supported catalyst using the same. In accordance with this patent, the reactor fouling phenomenon may occur, since the catalyst is separated from the carrier, when used in a gas phase process or a slurry phase process.

Meanwhile, Japanese Patent No. 6-56928 discloses a method for preparing a supported metallocene catalyst by supporting ligands on the surface of a carrier through chemical bonding, and bonding the ligands to a metal. This method has disadvantages of complicated catalyst preparation process and the difficulty in supporting a great amount of catalyst on a carrier.

Of the aforementioned various methods for preparing supported catalysts, the method comprising supporting aluminoxane, followed by reaction thereof with a metallocene compound, is the oldest method for preparing a heterogeneous single active site catalyst. For example, silica reacts with an aluminoxane solution, the reaction solution is filtered, and the filtrate reacts with zirconocene dissolved in toluene or an aliphatic hydrocarbon solvent to prepare a supported catalyst, which can be immediately used for ethylene polymerization or copolymerization in a gas phase process or a slurry phase process, without any further treatment. This supporting method enables preparation of a single-phase catalyst which exhibits relatively high activity and eliminates the necessity of using additional aluminoxane for a polymerization reactor, since the co-catalyst is physically or chemically bonded to the surface of carrier and the catalyst is ionically bonded to the co-catalyst, similar to a homogeneous system catalyst, thus readily applying to a conventional slurry or gas phase process. However, this method is disadvantageous in that the separation of catalyst cannot be completely prevented and, in some cases, fouling may thus occur, and aluminoxane which can be bonded to silica is limited, thus inevitably involving a limitation of a metallocene compound which can be bonded.

WO 2002/040549 discloses an olefin polymerization catalyst comprising a metallocene compound, a supported activator such as MAO, an ionization activator such as dimethylanilinium tetra(pentafluorophenyl)borate and triphenylcarbeniumtetra(pentafluorophenyl)borate and a carrier. Japanese Patent Publication No. 2008-121027 discloses a catalyst for preparing an olefin polymer, comprising a carrier such as silica, methylaluminoxane, a transition metal compound such as bis(indenyl)zirconium dichloride and [PhNMe$_2$H] [B(C$_6$F$_5$)$_4$]. U.S. Patent Publication Application No. 2006/0116490 discloses a metallocene catalyst for olefin polymerization comprising a combination of a carrier and an ionic compound such as aluminoxane and tetrakis (pentafluorophenyl) borate, as a co-catalyst, and a metallocene compound. Akihiro Yano disclosed an ethylene polymerization catalyst comprising dimethylanilinium tetrakis(pentafluorophenyl)borate (Me$_2$PhNH.B(C$_6$F$_5$)$_4$)/triisobutylaluminum (i-Bu$_3$Al) co-catalyst and a metallocene compound (Journal of Molecular Catalysis A: Chemical 156_2000.133-141). However, these catalysts have a disadvantage of low activity.

DISCLOSURE

Technical Problem

Therefore, the present invention has been made in view of the above problems, and it is one object of the present invention to provide a highly active supported metallocene catalyst in which a metallocene compound having a ligand substituted with alkoxide, aryloxide or the like is incorporated into a conventional supported metallocene catalyst and a borate compound is incorporated as a second co-catalyst, to exhibit considerably superior catalyst activity, as compared to the conventional metallocene-supported catalyst.

Further, it is another object of the present invention to provide a method for preparing a highly active supported metallocene catalyst.

Further, it is another object of the present invention to provide a method for preparing polyolefin using the supported metallocene catalyst, which can be applied to polyolefin polymerization preformed at a low pressure or a high pressure, can obtain polyolefin having a low molecular weight and a narrow molecular weight distribution and prevent fouling in the preparation process.

Technical Solution

In accordance with one aspect of the present invention, provided is a method for preparing a supported metallocene catalyst, comprising:

a carrier;

a first co-catalyst layer laminated on the carrier;

a first metallocene compound layer laminated on the first co-catalyst layer; and a second co-catalyst layer laminated on the first metallocene compound layer, wherein the first metallocene compound layer comprises at least one selected from the group consisting of metallocene compounds represented by the following Formulae 1 to 3:

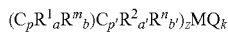

(1)

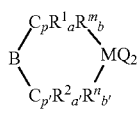

(2)

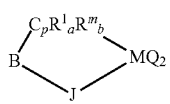

(3)

wherein Cp and Cp' are the same or different and are each independently at least one selected from the group consisting of cyclopentadienyl, indenyl, 4,5,6,7-tetrahydro-1-indenyl and fluorenyl radicals; R$^m$ and R$^n$ are the same or different and are each independently a hydrogen radical, or an alkyl having 1 to 20 carbon atoms, cycloalkyl having 3 to 20 carbon atoms, aryl having 6 to 20 carbon atoms, alkenyl having 2 to 20 carbon atoms, alkylaryl having 7 to 27 carbon atoms, arylalkyl having 7 to 27 carbon atoms, arylalkenyl radical having 8 to 20 carbon atoms or alkylsilyl radical having 1 to 20 carbon atoms; R$^1$ and R$^2$ are the same or different and are each independently hydrogen or a hydrocarbyl radical having 1 to 6 carbon atoms; a, a', b, and b' are each independently an integer of 1 to 4;

M is a transition metal selected from Group 4B, 5B and 6B elements on the Periodic Table;

Q is a halogen radical or an alkyl having 1 to 20 carbon atoms, alkenyl having 2 to 20 carbon atoms, aryl having 6 to carbon atoms, alkylaryl having 7 to 27 carbon atoms or arylalkyl radical having 7 to 27 carbon atoms, or an alkylidene radical having 1 to 20 carbon atoms; k is an integer of 2 or 3, z is integer of 0 or 1, and z is zero provided that k is 3;

B is an alkyl radical having 1 to 4 carbon atoms or at least one selected from the group consisting of hydrocarbyl radicals containing silicon, germanium, phosphorus, nitrogen, boron or aluminum;

J is at least one selected from the group consisting of NR$^s$, O, PR$^s$ and S, and R$^s$ is a C1-C20 alkyl radical or a substituted C1-C20 alkyl radical;

wherein any one hydrogen radical present in R$^m$, R$^n$, B or R$^s$ is a compound of Formula 4, 5 or 6,

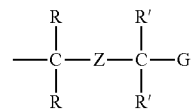

(4)

wherein Z is an oxygen atom or a sulfur atom, preferably an oxygen atom;

R, and R' are the same or different and are each independently a hydrogen radical, or a C1-C20 alkyl, C3-C20 cycloalkyl, C6-C20 aryl, C2-C20 alkenyl, C7-C27 alkylaryl, arylalkyl or C7-C27 arylalkenyl radical, or preferably a C1-C20 alkyl radical, in which two R' are joined together to form a ring;

G is C1-C20 alkoxy, C6-C20 aryloxy, C1-C20 alkylthio, C6-C20 arylthio, phenyl or substituted phenyl, preferably C1-C20 alkoxy, in which G is bonded to R' to form a ring;

wherein G is alkoxy or aryloxy, provided that Z is a sulfur atom;

Z is an oxygen atom, provided that G is alkylthio, arylthio, phenyl or substituted phenyl,

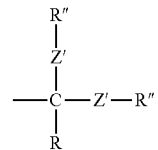

(5)

wherein

Z' is an oxygen atom or a sulfur atom, preferably an oxygen atom, and at least one of two Z' is an oxygen atom;

R and R" are the same or different and are each independently a hydrogen radical, or a C1-C20 alkyl, C3-C20 cycloalkyl, C6-C20 aryl, C2-C20 alkenyl, C7-C27 alkylaryl, C7-C27 arylalkyl or C8-C28 arylalkenyl radical, preferably a C1-C20 alkyl radical, in which R and R" or two R" are joined together to form a ring,

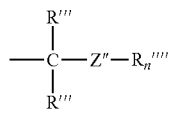 (6)

wherein Z" is an oxygen, sulfur, nitrogen, phosphorus or arsenic atom, preferably an oxygen atom;

R''' is a hydrogen radical, or a C1-C40 alkyl, C3-C40 cycloalkyl, C6-C40 aryl, C2-C40 alkenyl, C7-C47 alkylaryl, C7-C47 arylalkyl or C8-C48 arylalkenyl radical, each of which may be the same or different, preferably a C1-C40 alkyl radical, each of which may be the same or different;

R'''' is a hydrogen radical, or C1-C40 alkyl, C6-C40 aryl, C2-C40 alkenyl, C7-C47 alkylaryl, C1-C40 alkylsilyl, C6-C40 arylsilyl, phenyl or substituted phenyl, preferably a C1-C40 alkyl radical; and N is 1 or 2, preferably 1, n is 1, when Z" is oxygen or sulfur, and n is 2, when Z" is nitrogen, phosphorus or arsenic.

Further, in a preferred embodiment, the present invention provides a supported metallocene catalyst comprising:

a carrier;

a first co-catalyst layer laminated on the carrier;

a first metallocene compound layer laminated on the first co-catalyst layer; and a second co-catalyst layer laminated on the first metallocene compound layer, wherein the first metallocene compound layer comprises a metallocene compound represented by the following Formula 1; and a metallocene compound represented by the following Formulae 2 or 3.

In accordance with another aspect of the present invention, provided is a method for preparing a supported metallocene catalyst, comprising:

reacting a carrier with an aluminum-containing organometallic compound, as a first co-catalyst, to prepare a carrier on which the first co-catalyst is supported;

reacting the resulting carrier with a metallocene compound according to claim 1 or 2, to prepare a carrier on which the first co-catalyst layer and the metallocene compound are supported; and reacting the resulting carrier with a boron-containing organometallic compound, as a second co-catalyst to prepare a supported metallocene catalyst on which the first co-catalyst layer, the metallocene compound and the second co-catalyst layer are supported.

In accordance with yet another aspect of the present invention, provided is a method for preparing polyolefin by polymerizing olefin monomers in the presence of the supported metallocene catalyst in accordance with the present invention.

BEST MODE

Accordingly, preferred embodiments of the present invention will be described in detail.

In a preferred embodiment, in the compounds represented by Formulae 1 to 3, M is titanium, zirconium or hafnium, Q is preferably halogen, most preferably chlorine, and k is preferably 2.

Meanwhile, representative examples of metallocene compound represented by Formula 1 include $[A\text{-}O\text{---}(CH_2)_a\text{---}C_5H_4]_2ZrCl_2$ and $[A\text{-}O\text{---}(CH_2)_a\text{---}C_9H_6]ZrCl_3$, wherein a is an integer of 4 to 8, and A is at least one selected from the group consisting of methoxymethyl, t-butoxymethyl, tetrahydropyranyl, tetrahydrofuranyl, 1-ethoxyethyl, 1-methyl-1-methoxyethyl and t-butyl.

Meanwhile, in the compound represented by Formula 2, B is a structural bridge between two $C_p$ rings to impart steric rigidity to the $C_p$ ring in the catalyst, the $C_p$ rings in the metallocene catalyst are substituted in a substantially different manner to provide steric difference between the two $C_p$ rings, and $R^1_a R^m_b$ is selected to be a substituted ring such that $(C_p R^1_a R^m_b)$ is substantially different from $(C_p R^2_a R^n_b)$.

In a preferred embodiment, representative examples of the metallocene compound represented by Formula 2 include $[A\text{-}O\text{---}(CH_2)_a\text{---}C_5H_4]C(CH_3)_2[C_{13}H_8]ZrCl_2$, $[A\text{-}O\text{---}(CH_2)_a\text{---}C_5H_4]Si(CH_3)_2[Cl_3H_8]ZrCl_2$, $[C_5H_5]C(CH_3)(A\text{-}O\text{---}(CH_2)_a)[Cl_3H_8]ZrCl_2$ and $[C_5H_5]Si(CH_3)(A\text{-}O\text{---}(CH_2)_a)[C_{13}H_8]ZrCl_2$, wherein a is an integer of 4 to 8, and A is at least one selected from the group consisting of methoxymethyl, t-butoxymethyl, tetrahydropyranyl, tetrahydrofuranyl, 1-ethoxyethyl, 1-methyl-1-methoxyethyl and t-butyl.

In a preferred embodiment, an representative example of the metallocene compound represented by the Formula 3 is $[(A'\text{-}D\text{-}(CH_2)_a)](CH_3)X(C_5Me_4)(NCMe_3)]TiCl_2$ wherein X is methylene, ethylene or silicon, D is an oxygen or nitrogen atom, and A' is at least one selected from the group consisting of hydrogen, C1-C20 alkyl, C2-C20 alkenyl, C6-C20 aryl, C7-C27 alkylaryl, C7-C27 arylalkyl, C1-C20 alkylsilyl, C6-C20 arylsilyl, methoxymethyl, t-butoxymethyl, tetrahydropyranyl, tetrahydrofuranyl, 1-ethoxyethyl, 1-methyl-1-methoxyethyl and t-butyl.

The carrier used for the present invention has a highly reactive hydroxyl group and a siloxane group, obtained by drying and thus removing moisture on the surface thereof. Specifically, examples of useful carriers include silica, silica-alumina, silica-magnesia and the like, which are dried at a high temperature, and these carriers may generally contain oxide, carbonate, sulfate or nitride such as $Na_2O$, $K_2CO_3$, $BaSO_4$ or $Mg(NO_3)_2$. The drying temperature is 200 to 800° C., preferably 300 to 600° C., more preferably, 300 to 400° C. When the drying temperature is lower than 200° C., moisture is excessively more, moisture present on the surface of carrier reacts with a co-catalyst, and when the drying temperature exceeds 800° C., a great amount of hydroxyl groups on the surface thereof is removed and only the siloxane groups remain, thus disadvantageously reducing a reaction site with the co-catalyst.

The carrier thus dried is mixed with the first co-catalyst represented by Formula 7 to form a carrier on which the first co-catalyst is supported. The first co-catalyst is an organometallic compound containing aluminum, which is the same as the co-catalyst used for olefin polymerization in the presence of a general metallocene catalyst. When the first co-catalyst is supported, a hydroxyl group present in the resulting support is bonded to the aluminum metal.

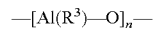 (7)

wherein R3 is a halogen radical, a C1-C20 hydrocarbyl radical or a halogen-substituted C1-C20 hydrocarbyl radical, which may be the same or different; and n is an integer of 2 or higher.

The compound of Formula 7 may have a linear, circular or net shape and examples of these compounds include methylaluminoxane (MAO), ethylaluminoxane, isobutylaluminoxane, butylaluminoxane and the like.

The metallocene compound of the present invention is incorporated into a first co-catalyst layer-supported carrier to prepare a carrier on which the first co-catalyst layer and the metallocene compound are supported, and the carrier is mixed with a second co-catalyst of the following Formula 8, to prepare a supported metallocene catalyst on which the first co-catalyst layer, the metallocene compound and the second co-catalyst layer are supported.

$$T^+[BQ_4]^- \quad \text{[Formula 8]}$$

wherein $T^+$ is a positive monovalent (+1) polyatomic ion;

B is boron having an oxidation state of +3; Q is each independently selected from hydride, dialkylamido, halide, alkoxide, aryloxide, hydrocarbyl, halocarbyl and halo-substituted-hydrocarbyl radicals, in which Q has carbon atoms of 20 or less, provided that only one or less of Q is halide.

As examples of compounds represented by Formula 8, non-limiting examples of ion-forming compound containing proton-donating cation useful as an activated co-catalyst for the preparation of the catalyst include tri-substituted ammonium salts, such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate and N,N-dimethyl-(2,4,6-trimethylanilinium)tetrakis-(2,3,4,6-tetrafluorophenyl)borate; dialkyl ammonium salts, such as dioctadecylammonium tetrakis(pentafluorophenyl)borate, ditetradecylammonium tetrakis(pentafluorophenyl)borate and dicyclohexylammonium tetrakis(pentafluorophenyl)borate; and tri-substituted phosphonium salts, such as triphenylphosphonium tetrakis(pentafluorophenyl)borate, methyldioctadecylphosphonium tetrakis(pentafluorophenyl)borate and tri(2,6-dimethylphenyl)phosphonium tetrakis(pentafluorophenyl)borate. Preferred are long chain alkyl mono-substituted and di-substituted ammonium complexes, particularly preferred are $C_{14}$-$C_{20}$ alkyl ammonium complexes, and more particularly preferred are methyldi(octadecyl)ammonium tetrakis(pentafluorophenyl)borate and methyldi(tetradecyl)-ammonium tetrakis(pentafluorophenyl) borate and mixtures thereof. Such a mixture comprises protonated ammonium cations derived from amine containing two $C_{14}$, $C_{16}$ or $C_{18}$ alkyl groups and one methyl group. Such amine is commercially available under the trade name of Kemamine T9701, from Witco Corp. and under the trade name of Armeen M2HT, from Akzo-Nobel Corp.).

Meanwhile, a molar ratio of [boron]/[transition metal] in the supported metallocene catalyst is 0.01 to 1,000, preferably, 0.1 to 100, more preferably 0.2 to 10. When the molar ratio is lower than 0.01, the content of boron is excessively low, activity enhancement effect is considerably low, and when the molar ratio exceeds 1,000, the activity does not increase any more, and the amount of borate compound which is not supported and remains increases, thus causing fouling in the reactor during polymerization.

Further, the supported metallocene catalyst of the present invention may be used for olefin polymerization without any treatment, and may be used as a pre-polymerized catalyst prepared by separately coming a catalyst into contact with an olefin-based monomer such as ethylene, propylene, 1-butene, 1-hexene or 1-octene.

The method for preparing the supported metallocene catalyst for polyolefin polymerization includes:

a) reacting a carrier with an aluminum-containing organometallic compound, as a first co-catalyst, to prepare a carrier on which the first co-catalyst is supported;

b) reacting the first co-catalyst layer-supported carrier with a metallocene compound in accordance with the present invention to prepare a carrier on which the first co-catalyst layer and the metallocene compound are supported; and c) reacting the resulting carrier with a boron-containing organometallic compound, as a second co-catalyst to prepare a supported metallocene catalyst on which the first co-catalyst layer, the metallocene compound and the second co-catalyst layer are supported.

In accordance with the present invention, an aluminum-containing organometallic compound, as a first co-catalyst, reacts with a carrier, the co-catalyst reacts with a metallocene compound in which a cyclopentadine or cyclopentadine derivative, or a bridge group is substituted by a functional group such as alkoxy acting as a Lewis base (as an oxygen-donor (O-donor)), to prepare a carrier on which the first co-catalyst layer and the metallocene compound are supported, and the resulting carrier reacts with a boron-containing organometallic compound, as a second co-catalyst, to prepare a supported metallocene catalyst on which the first co-catalyst layer, the metallocene compound and the second co-catalyst layer are supported. During olefin polymerization, the supported catalyst is not separated. Accordingly, the present invention can provide a supported metallocene catalyst exhibiting superior polymerization activity without causing fouling in the reactor.

The reaction (a) of the carrier with the first co-catalyst may be carried out in the presence or absence of a solvent. Examples of useful solvents include aliphatic hydrocarbon solvents such as hexane or pentane, and aromatic hydrocarbon solvents such as toluene.

The reaction temperature in step (a) may be −20° C. to 100° C., a range in which the reaction solvent is present in a liquid state, preferably −10° C. to 100° C., more preferably 0° C. to 80° C., a range in which the reaction is optimized. Meanwhile, the reaction period may be 10 minutes to 24 hours.

The co-catalyst-supported catalyst may be used without further treatment, after the reaction solvent is moved through filtration or distillation under reduced pressure, or subjected to Soxhlet filtering using aromatic hydrocarbon such as toluene, if necessary.

Examples of solvents used for the reaction (b) of the first co-catalyst-supported carrier with the metallocene catalyst include aliphatic hydrocarbon solvents such as hexane or pentane, aromatic hydrocarbon solvents such as toluene or benzene, chlorinated hydrocarbon solvents substituted such as dichloromethane, ether solvents such as diethylether or THF, common organic solvents such as acetone or ethylacetate. Preferred are hexane, heptane and toluene.

Preferably, the reaction temperature of step (b) may be 0° C. to 100° C., and the reaction period may be 5 minutes to 24 hours.

Examples of solvents used for the reaction (c) of the carrier, on which the first co-catalyst and the metallocene compound are supported, with the second co-catalyst include aliphatic hydrocarbon solvents such as hexane or pentane, aromatic hydrocarbon solvents such as toluene or benzene, chlorinated hydrocarbon solvents such as dichloromethane, ether solvents such as diethylether or THF, and common organic solvents such as acetone or ethylacetate. Preferred are hexane, heptanes and toluene.

Preferably, the reaction temperature of step (C) may be 0° C. to 100° C., and the reaction period may be 5 minutes to 24 hours.

The co-catalyst-supported catalyst may be used without further treatment after the reaction solvent is moved through filtration or distillation under reduced pressure, or subjected to Soxhlet filtering using aromatic hydrocarbon such as toluene, if necessary.

The polymerization of polyolefin using the supported metallocene catalyst in accordance with the present invention may be carried out by a solution process, a slurry process, a gas phase process, and a combination of slurry and gas phase processes, preferably a slurry process or a gas phase process.

The supported metallocene catalyst of the present invention may be injected in a slurry phase diluted in an aliphatic hydrocarbon solvent having 5 to 12 carbon atoms suitable for olefin polymerization, such as pentane, hexane, heptane, nonane, decane and an isomer thereof, aromatic hydrocarbon solvents such as toluene or benzene, and chlorinated hydrocarbon solvents substituted such as dichloromethane or chlorobenzene. The solvent used is preferably treated with a small amount of alkyl aluminum to remove a small amount of water, air and the like serving as catalytic poisons, and may be further treated with a co-catalyst.

Examples of olefin monomers which can be polymerized using the supported metallocene catalyst of the present invention include ethylene, propylene, alpha-olefin, cyclic olefin and the like, and diene and triene olefin monomers having two or more double bonds polymerization. Examples of diene and triene olefin monomers include ethylene, propylene, 1-butene, 1-pentene, 4-methyl-l-pentene, 1-hexene, 1-heptene, 1-decene, 1-undecene, 1-dodecene, 1-tetradecene, 1-hexadecene, 1-eicosene, norbornene, norbonadiene, ethylidene norbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene and the like. Two or more of these monomers may be copolymerized.

Now, the present invention will be described in more detail with reference to the following Examples. These examples are provided only for illustrating the present invention and should not be construed as limiting the scope and spirit of the present invention.

EXAMPLES

Organic reagents and solvents required for catalyst preparation and polymerization were used after purifying the products available from Aldrich corp. in accordance with a standard method. A highly pure ethylene gas (available from Applied Gas Technology, Corp.) was polymerized after passing through a moisture scavenging and oxygen-scavenging filter. The contact of air and moisture are blocked in all steps such as catalyst synthesis and support, and olefin polymerization, to enhance reproducibility of experiments.

Meanwhile, the structure of the catalysts was analyzed by Nuclear Magnetic Resonance (NMR) spectroscopy employing a 300 MHz Bruker instrument.

Meanwhile, an inductively coupled plasma-atomic emission Spectrometer (ICP-AES), the model of XMP integra, was used to analyze the supported catalyst. The contents of the supported catalyst and zirconium and boron of the filtrate after reaction were obtained through the ICP analysis.

Preparation Example 1

Synthesis of $[t-Bu-O-(CH_2)_6-C_5H_4]_2ZrCl_2$ t-butyl-O—$(CH_2)_6$—Cl was prepared using 6-chlorohexanol in accordance with the method disclosed in the document (Tetrahedron Lett. 2951 (1988)) and was then reacted with NaCp to obtain t-Butyl-O—$(CH_2)_6$—$C_5H_5$ (yield: 60%, b.p. 80° C./0.1 mmHg). Further, t-Butyl-O—$(CH_2)_6$—$C_5H_5$ was dissolved in THF at −78° C., normal butyl lithium (n-BuLi) was slowly added thereto, warmed to room temperature, and reacted for 8 hours. The above solution was additionally reacted at room temperature for further 6 hours after slowly adding a pre-synthesized lithium salt solution in_suspension solution of $ZrCl_4(THF)_2$ (1.70 g, 4.50 mmol)/THF (30 ml) at −78° C. All volatile substances were dried under vacuum and the resulting oily liquid was filtered by addition of a hexane solvent. The filtrate was dried under vacuum and hexane was added thereto to induce a precipitate at a low temperature of −20° C. The resulting precipitate was filtered at a low temperature, to obtain a $[tBu-O-(CH_2)_6-C_5H_4]_2ZrCl_2$ compound as a white solid (yield 92%).

1H NMR (300 MHz, $CDCl_3$): 6.28 (t, J=2.6 Hz, 2 H), 6.19 (t, J=2.6 Hz, 2 H), 3.31 (t, 6.6 Hz, 2 H), 2.62 (t, J=8 Hz), 1.7-1.3 (m, 8 H), 1.17 (s, 9 H).

13C NMR ($CDCl_3$): 135.09, 116.66, 112.28, 72.42, 61.52, 30.66, 30.61, 30.14, 29.18, 27.58, 26.00.

Preparation Example 2

Synthesis of [methyl(6-t-buthoxyhexyl)silyl($\eta^5$-tetramethylCp)(t-Butylamido)]$TiCl_2$ 50 g of Mg(s) was charged in a 10 L reactor at room temperature and 300 mL of THF was added thereto. 0.5 g of $I_2$ was added to the reaction mixture and the temperature of reactor was maintained at 50° C. After the temperature of the reactor was stabilized, 250 g of 6-t-buthoxyhexyl chloride was added to the reactor at a rate of 5 mL/min using a feeding pump. As 6-t-butoxyhexylchloride was added, it was observed that the temperature of reactor was increased by about 4 to 5° C. While 6-t-butoxyhexylchloride was continuously added, the reaction mixture was stirred for 12 hours. After the reaction was performed for 12 hours, a black reaction solution was obtained. Water was added to 2 mL of the resulting black solution and the resulting organic layer was subjected to 1H-NMR. As a result, it could be confirmed that 6-t-buthoxyhexane was formed and a Grignard reaction was smoothly performed from 6-t-butoxyhexane. 6-t-buthoxyhexyl magnesium chloride was synthesized.

500 g of $MeSiCl_3$ and 1 L of THF were added to a reactor and the temperature of the reactor was decreased to −20° C. 560 g of 6-t-butoxyhexyl magnesium chloride thus synthesized was added to the reactor at a rate of 5 mL/min using a feeding pump. After the addition of the Grignard reagent, the reaction mixture was stirred for 12 hours, while the temperature of the reactor was slowly increased to room temperature. After the reaction was performed for 12 hours, production of a white MgCl$_2$ salt was observed. 4 L of hexane was added thereto and the salt was removed a filter press dewatering system for experiments (labdori, manufactured by HAN-GANG ENG CO., LTD) to obtain a filter solution. After the filter solution was added to the reactor, hexane was removed at 70° C. to obtain a light yellow liquid. It was confirmed through the 1H-NMR that the obtained liquid was methyl(6-t-butoxyhexyl)dichlorosilane compound.

1H-NMR (CDCl$_3$): 3.3 (t, 2H), 1.5 (m, 3H), 1.3 (m, 5H), 1.2 (s, 9H), 1.1 (m, 2H), 0.7 (s, 3H).

1.2 mole of tetramethylcyclopentadiene (150 g) and 2.4 L of THF were added to the reactor and the reactor temperature was then reduced to −20° C. 480 mL of n-BuLi was added to the reactor using the feeding pump at a rate of 5 mL/min. After n-BuLi was added, the reactor temperature was slowly increased to normal temperature and stirring was performed for 12 hours. After the reaction was performed for 12 hours, an equivalent of methyl(6-t-buthoxy hexyl)dichlorosilane (326 g, 350 mL) was rapidly added to the reactor. The reactor temperature was slowly increased to normal temperature and stirring was performed for 12 hours. Then, the reactor temperature was reduced to 0° C. and 2 equivalent of t-BuNH2 was added. The reactor temperature was slowly increased to normal temperature and stirring was performed for 12 hours. After the reaction was performed for 12 hours, THF was removed and 4 L of hexane was added to obtain the filter solution from which the salt was removed using the labdori. After the filter solution was added to the reactor, hexane was removed at 70° C. to obtain a yellow solution. It was confirmed through 1H-NMR that the obtained yellow solution was the desired methyl(6-t-buthoxyhexyl)(tetramethylCpH) t-butyl aminosilane compound.

TiCl$_3$(THF)$_3$ (10 mmol) was rapidly added to n-BuLi and the dilithium salt of the ligand at −78° C., which was synthesized from the ligand dimethyl(tetramethylCpH)t-butylaminosilane in the THF solution. The reaction solution was stirred for 12 hours while the temperature was slowly increased from −78° C. to normal temperature. After the stirring was performed for 12 hours, an equivalent of PbCl$_2$ (10 mmol) was added to the reaction solution at normal temperature and the agitation was performed for 12 hours. After the stirring was performed for 12 hours, a dark black solution rendering a blue color was obtained. After THF was removed from the produced reaction solution, hexane was added to filter the product. After hexane was removed from the filter solution, it was confirmed through $^1$H-NMR that the solution was the desired [methyl(6-t-buthoxyhexyl)silyl($\eta_5$-tetramethylCp)(t-Butylamido)]TiCl$_2$ compound.

1H-NMR (CDCl$_3$): 3.3 (s, 4H), 2.2 (s, 6H), 2.1 (s, 6H), 1.8~0.8 (m), 1.4 (s, 9H), 1.2 <136> (s, 9H), 0.7 (s, 3H)

Preparation Example 3

Preparation of [(CH$_2$)$_4$—C$_5$H$_4$]$_2$ZrCl$_2$

[(CH$_2$)$_4$—C$_5$H$_4$]$_2$ZrCl$_2$ was available from Aldrich Corp.

Preparation Example 4

Synthesis of 6-t-butoxyhexylmethylsilylbisindenyl zirconium dichloride 17.5 ml of a 2.5M n-BuLi solution was added to a solution of 5 ml of indene dissolved in 20 ml ether at 0° C. for 20 minutes, and stirred at normal temperature for 2 hours. 5.25 g of t-butoxyhexylmethyldichlorosilane was dissolved in 10 ml of hexane, and the resulting solution was added to an indenyl lithium solution at −78° C. over 10 minutes. The reaction solution was stirred at normal temperature for 3 hours, lithium chloride was removed by filtering and the solvent was dried under vacuum to obtain a mixture of structural isomers. The structural isomers were confirmed by $^1$H NMR.

$^1$H NMR (500 MHz, CDCl$_3$): 1.17 (t-BuO, 9H, s), 3.59 (Indene, 2H, m), 0.21 (MeSi, 3H, s), 0.47 (CH$_2$, 2H, m), 0.89 (CH$_2$, 2H, m), 1.28 (CH$_2$, 2H, m), 1.56 (CH$_2$, 4H, m), 3.26 (OCH$_2$, t, J$_{HH}$=0.014), 7.48 (ArH, 2H, m), 7.38 (ArH, 2H, m), 7.26 (ArH, 2H, m), 7.16 (ArH, 2H, m), 6.90 (indene, H, m), 6.60 (ArH, 2H, m).

The substance confirmed through $^1$H NMR was dissolved in 40 ml of ether and 17.5 ml of 2.5M n-BuLi solution was added thereto at −78° C. for 20 minutes. The solution was stirred at normal temperature for 3 hours, hexane was added thereto to obtain a solid and the solid was filtered to obtain a product.

1 g of zirconium chloride was stirred in 20 ml of toluene. 30 ml of a toluene/ether (1:2) solution was added to 2.3 g of the ligand solid obtained above and the resulting mixture was added to a zirconium chloride mixture at a temperature of −78° C. for 20 minutes. The resulting mixture was stirred at normal temperature for 16 hours and filtered. The resulting substance was recrystallized with hexane to obtain a final catalyst.

$^1$H NMR (500 MHz, C$_6$D$_6$): 1.15 (t-BuO, 9H, s), 1.12 (MeSi, 3H, s), 1.34 (CH$_2$, 6H, m), 1.47 (CH$_2$, 2H, m), 1.60 (CH$_2$, 2H, m), 3.26 (OCH$_2$, t, J$_{HH}$=0.014, 7.40 (ArH, 2H, m), 7.33 (ArH, 2H, m), 7.28 (ArH, 2H, m), 7.16 (ArH, 2H, m), 6.90 (indene, H, m), 5.83 (ArH, 2H, m)

Preparation Example 5

Synthesis of [t-Bu-O—(CH$_2$)$_6$—C$_5$H$_4$]$_2$HfCl$_2$ t-butyl-O—(CH$_2$)$_6$—Cl was prepared using 6-chlorohexanol in accordance with the method disclosed in the document (Tetrahedron Lett. 2951 (1988)) and was then reacted with NaCp to obtain t-Butyl-O—(CH$_2$)$_6$—C$_5$H$_5$ (yield: 60%, b.p. 80° C./0.1 mmHg). Further, t-Butyl-O—(CH$_2$)$_6$—C$_5$H$_5$ was dissolved in THF at −78° C., normal butyl lithium (n-BuLi) was slowly added thereto, warmed to room temperature, and reacted for 8 hours. The solution was additionally reacted at room temperature for 6 hours while the synthesized lithium salt solution was slowly added to the suspension solution of ZrCl$_4$(THF)$_2$ (1.70 g, 4.50 mmol)/THF (30 ml) at −78° C. All volatile substances were dried under vacuum and the resulting oily liquid was filtered by addition of a hexane solvent. The filtrate was dried under vacuum and hexane was added thereto to induce a precipitate at a low temperature of −20° C. The resulting precipitate was filtered at a low temperature, to obtain a [tBu-O—(CH$_2$)6—C$_5$H$_4$]$_2$HfCl$_2$ compound as a white solid (yield 88%).

$^1$H-NMR (300 MHz, CDCl$_3$): 6.19 (t, J=2.6 Hz, 2 H), 6.08 (t, J=2.6 Hz, 2 H), 3.31 (t, 6.6 Hz, 2 H), 2.65 (t, J=8 Hz), 1.56-1.48 (m, 4 H), 1.34 (m, 4 H), 1.17 (s, 9 H).

$^{13}$C-NMR (CDCl$_3$): 134.09, 116.06, 111.428, 72.42, 61.33, 30.42, 30.67, 30.14, 29.20, 27.52, 26.01.

Example 1

10 ml of toluene was added to 3 g of sintered silica (Sylopol 2212, Grace Davison) with a surface area of 280 m$^2$/g and a pore volume of 1.47 ml/g and the resulting mixture was reacted with 15 ml of MAO (10 wt % toluene solution) at 70°

C. for 2 hours, and the treated silica was washed with toluene to remove a un-reacted MAO solution. The remaining solids reacted with 0.72 mmole of the metallocene compound of Preparation Example 1 having a tert butoxy-group at 50° C. for one hour and then washed with toluene. The reaction solution reacted with 1.2 mmole of trityl tetrakis (penta-fluoro-phenyl)borate (TB) at 50° C. for one hour and dried under reduced pressure at 50° C. to prepare a solid catalyst. The molar ratio of boron (B)/transition metal (Zr) was 1.3.

Example 2

A catalyst was prepared in the same manner as in Example 1, except that 0.6 mmole of trityl tetrakis (penta-fluoro-phenyl)borate (TB) was used. The molar ratio of boron (B)/transition metal (Zr) was 0.7.

Example 3

A catalyst was prepared in the same manner as in Example 1, except that 0.15 mmole of trityl tetrakis (penta-fluoro-phenyl)borate (TB) was used. The molar ratio of boron (B)/transition metal (Zr) was 0.2.

Example 4

A catalyst was prepared in the same manner as in Example 1, except that dimethylanilinium tetrakis(pentafluorophenyl)borate trityl (AB) was used instead of TB.

Example 5

A catalyst was prepared in the same manner as in Example 1, except that the metallocene compound of Preparation Example 2 having a tert butoxy-group was used instead of the metallocene compound of Preparation Example 1.

Example 6

A catalyst was prepared in the same manner as in Example 1, except that the bis indenyl metallocene compound of Preparation Example 4 was used, instead of the metallocene compound of Preparation Example 1.

Example 7

10 ml of toluene was added to 3 g of sintered silica (Sylopol 2212, Grace Davison) with a surface area of 280 m²/g and a pore volume of 1.47 ml/g and reacted with 15 ml of MAO (10 wt % toluene solution) at 70° C. for 2 hours, and the reaction solution was washed with toluene to remove a un-reacted MAO solution. The remaining solution reacted with 0.48 mmole of the metallocene compound of Preparation Example 1 and 0.24 mmole of the metallocene compound of Preparation Example 2 having a tert butoxy-group at 50° C. for one hour, and was then washed with toluene. The reaction solution reacted with trityl tetrakis (penta-fluoro-phenyl)borate (TB) at 50° C. for one hour and was dried under reduced pressure at 50° C. to prepare a solid catalyst.

Comparative Example 1

A catalyst was prepared in the same manner as in Example 1, except that 30 ml of MAO was used, instead of 15 ml of MAO and no TB was treated.

Comparative Example 2

A catalyst was prepared in the same manner as in Example 1, except that 15 ml of MAO (10 wt % toluene solution) reacted at 50° C. for one hour, instead of trityl tetrakis (penta-fluoro-phenyl)borate (TB), the unreacted MAO was removed, and the residue was washed with toluene and dried under reduced pressure at 50° C.

Comparative Example 3

A catalyst was prepared in the same manner as in Example 5, except that no TB was used.

Comparative Example 4

A catalyst was prepared in the same manner as in Example 1, except that the metallocene compound of Preparation Example 3 was used.

Comparative Example 5

A catalyst was prepared in the same manner as in Comparative Example 4, except that no TB was used.

Comparative Example 6

A catalyst was prepared in the same manner as in Example 6, except that no TB was used.

Comparative Example 7

A catalyst was prepared in the same manner as in Example 7, except that no TB was used.

Preparation of Polyethylene and Evaluation of Physical Properties Thereof

1) Melt index (MI, 2.16 kg): measured at a measurement temperature 190° C., based on ASTM 1238.
2) High load melt index (HLMI, 21.16 kg): measured at a measurement temperature 190° C., based on ASTM 1238.
3) MFR (HLMI/MI): A ratio of HLMI melt index (MI, 21.6 kg load) to MI (MI, 2.16 kg load).

Example 8

3 L of normal hexane was added to a high-pressure reactor with a volume of 5 L such that the high-pressure reactor does not contact air and oxygen, triethyl aluminum was added thereto such that the concentration of triethyl aluminum was 0.6 mmol/L, with respect to normal hexane, and 30 mg of the solid catalyst prepared in Example 1 was added thereto. Then, ethylene was continuously added at 80° C., and polymerization was performed for 2 hours, whiling maintaining a pressure of 9 bar. Then, the supply of ethylene was ceased, and the pressure was removed to complete the reaction. The resulting suspension was separated and dried to prepare polyethylene particles.

Example 9

Polyethylene particles were prepared in the same manner as in Example 8, except that the catalyst prepared in Example 2 was used instead of the catalyst prepared in Example 1.

Example 10

Polyethylene particles were prepared in the same manner as in Example 8, except that the catalyst prepared in Example 3 was used instead of the catalyst prepared in Example 1.

Example 11

Polyethylene particles were prepared in the same manner as in Example 8, except that the catalyst prepared in Example 4 was used instead of the catalyst prepared in Example 1.

Example 12

Polyethylene particles were prepared in the same manner as in Example 8, except that the catalyst prepared in Example 5 was used instead of the catalyst prepared in Example 1.

Example 13

Polyethylene particles were prepared in the same manner as in Example 8, except that the catalyst prepared in Example 6 was used instead of the catalyst prepared in Example 1.

Example 14

Polyethylene particles were prepared in the same manner as in Example 8, except that 30 mg of the solid catalyst prepared in Comparative Example 1 was added, instead of the catalyst prepared in Example 1 and TB was further added in an amount corresponding to a molar ratio of B/Zr of 2.

Example 15

Polyethylene particles were prepared in the same manner as in Example 8, except that ethylene was polymerized at 40 bar.

Example 16

Polyethylene particles were prepared in the same manner as in Example 15, except that AB was used, instead of TB.

Example 17

Polyethylene particles were prepared in the same manner as in Example 8, except that the catalyst prepared in Example 7 was used instead of the catalyst prepared in Example 1.

Example 18

Polyethylene particles were prepared in the same manner as in Example 17, except that ethylene was polymerized at 40 bar.

Comparative Example 8

Polyethylene particles were prepared in the same manner as in Example 8, except that the catalyst prepared in Comparative Example 1 was used instead of the catalyst prepared in Example 1.

Comparative Example 9

Polyethylene particles were prepared in the same manner as in Example 8, except that the catalyst prepared in Comparative Example 4 was used instead of the catalyst prepared in Example 1.

Comparative Example 10

Polyethylene particles were prepared in the same manner as in Example 8, except that the catalyst prepared in Comparative Example 3 was used instead of the catalyst prepared in Example 1.

Comparative Example 11

Polyethylene particles were prepared in the same manner as in Example 8, except that the catalyst prepared in Comparative Example 5 was used instead of the catalyst prepared in Example 1.

Comparative Example 12

Polyethylene particles were prepared in the same manner as in Example 8, except that the catalyst prepared in Comparative Example 6 was used instead of the catalyst prepared in Example 1.

Comparative Example 13

Polyethylene particles were prepared in the same manner as in Example 8, except that the catalyst prepared in Comparative Example 2 was used instead of the catalyst prepared in Example 1.

Comparative Example 14

Polyethylene particles were prepared in the same manner as in Comparative Example 8, except that ethylene was polymerized at 40 bar.

Comparative Example 15

Polyethylene particles were prepared in the same manner as in Example 8, except that the catalyst prepared in Comparative Example 7 was used instead of the catalyst prepared in Example 7.

Comparative Example 16

Polyethylene particles were prepared in the same manner as in Example 15, except that ethylene was polymerized at 40 bar.

Table 1 shows low-pressure polymerization in which ethylene polymerization is performed at a low pressure of 9 bar, and Table 2 shows high-pressure polymerization in which ethylene polymerization is performed at a high pressure of 40 bar.

TABLE 1

| Examples | Borate co-catalyst | Supported metallocene catalyst | Activity (KgPE/gCat) | MI (2.16 Kg) (g/10 min) | MFR |
|---|---|---|---|---|---|
| Ex. 8 | TB | Ex. 1 | 39 | 1.2 | 17 |
| Ex. 9 | TB | Ex. 2 | 36 | 0.85 | 18 |
| Ex. 10 | TB | Ex. 3 | 7 | 0.69 | 19 |
| Ex. 11 | AB | Ex. 4 | 31 | 1.1 | 17 |
| Ex. 12 | TB | Ex. 5 | 3.5 | <0.1 | — |
| Ex. 13 | TB | Ex. 6 | 4.5 | 0.68 | 35 |
| Ex. 14 | TB | Ex. 1 | 9.4 | 0.4 | 22 |
| Ex. 17 | TB | Ex. 7 | 36 | 1.1 | 21 |
| Comp. Ex. 8 | — | Comp. Ex. 1 | 3.1 | 0.78 | 17 |
| Comp. Ex. 9 | TB | Comp. Ex. 4 | 0.9 | <0.1 | — |

TABLE 1-continued

| Examples | Borate co-catalyst | Supported metallocene catalyst | Activity (KgPE/gCat) | MI (2.16 Kg) (g/10 min) | MFR |
|---|---|---|---|---|---|
| Comp. Ex. 10 | — | Comp. Ex. 3 | 0.3 | 1.1 | 18 |
| Comp. Ex. 11 | — | Comp. Ex. 5 | 0.7 | 1.2 | 17 |
| Comp. Ex. 12 | — | Comp. Ex. 6 | 0.5 | 0.16 | 49 |
| Comp. Ex. 13 | — | Comp. Ex. 2 | 10 | 0.75 | 23 |
| Comp. Ex. 15 | — | Comp. Ex. 7 | 2.7 | 0.74 | 23 |

In Table 1, TB is trityl tetrakis (penta-fluoro-phenyl)borate, and AB is dimethylanilinium Tetrakis(pentafluorophenyl)borate trityl.

In Table 1, polyethylenes prepared in Example 11 and Comparative Example 8 have an excessively high molecular weight, thus making it impossible to accurately measure HLMI as well as MI thereof.

TABLE 2

| Examples | Borate co-catalyst | Supported metallocene catalyst | Activity (KgPE/gCat) | HLMI (21.6 kg) (g/10 min) | MFR |
|---|---|---|---|---|---|
| Ex. 15 | TB | Ex. 1 | 78 | 1.8 | 18 |
| Ex. 16 | AB | Ex. 4 | 102 | 1.5 | 18 |
| Ex. 18 | TB | Ex. 7 | 87 | 1.2 | 22 |
| Comp. Ex. 14 | — | Comp. Ex. 1 | 12 | 0.61 | 21 |
| Comp. Ex. 16 | — | Comp. Ex. 7 | 10 | 0.35 | 23 |

Referring to Tables 1 and 2, as compared to polymerization using a catalyst of Comparative Example 8, to which borate is not applied, polymerization using supported catalysts of Examples 8 to 11 in which the catalyst of Preparation Example 1 was used and borate (AB, TB) was further incorporated at a molar ratio of 0.2 to 1.3, with respect to Zr, exhibited a 2- to 13-fold increase in activity. As compared to Comparative Example 13 in which MAO was further added to improve activity, Example 8 exhibited an about 4-fold increase in activity.

As compared to Comparative Example 8, to which borate was not applied, Example 8, in which the catalyst of Preparation Example 2 was used and TB was further incorporated at a molar ratio of TB to Zr of 1.3, exhibited an about 13-fold increase in activity. However, Comparative Example 11, in which polymerization was performed using the supported catalyst of Preparation Example 3 containing no alkoxy alkyl ligand, exhibited a decrease in activity.

It was confirmed, that Example 14 in which borate was not applied to a catalyst and was added during polymerization to prepare a supported metallocene catalyst, exhibited an about 3-fold increase in activity, as compared to Comparative Example 8.

As can be seen from Table 2, even in the case of polymerization at a high pressure of 40 bar, Examples 15 and of supported catalysts, to which borate was applied, exhibited an about 6- to 9-fold increase in activity, as compared to Comparative Example 14.

Further, in the process of preparing metallocene-supported catalysts, as compared to Comparative Examples 15 and 16 in which MAO was used alone, Examples 17 and 18, in which borate was further incorporated, exhibited an about 10-fold increase in activity.

Examples 17 and 18, in which ethylene was polymerized using hybrid supported metallocene catalysts containing two or more metallocene compounds, could more improve MFR of polymer, and the use of catalysts containing a variety of two or more metallocene compounds enables control of MFR of polymers.

Accordingly, it is possible to control the activity of catalysts and prepare a polymer having various physical properties and molecular weight distribution, by controlling a mix ratio of respective metallocene catalysts in the hybrid supported metallocene catalyst of the present invention. This means that the metallocene supported catalyst with a controllable molecular weight distribution can be prepared in a single reactor.

[Industrial Applicability]

As apparent from the fore-going, the present invention provides a supported metallocene catalyst in which a metallocene compound having a ligand substituted with alkoxide or aryloxide is incorporated into a conventional supported metallocene catalyst and a borate compound is incorporated as a second co-catalyst, thus exhibiting considerably superior catalyst activity, as compared to the conventional metallocene-supported catalyst. Further, a supported metallocene catalyst in which two or more metallocene compounds having a ligand substituted with alkoxide, aryloxide or the like are incorporated into a conventional supported metallocene catalyst and a borate compound is incorporated as a second co-catalyst, also exhibits considerably superior catalyst activity, as compared to the conventional metallocene-supported catalyst.

Further, the present invention provides a method for preparing a highly active supported metallocene catalyst in a simple process.

Further, the present invention provides a method for preparing polyolefin using the supported metallocene catalyst in accordance with the present invention, which can be applied to polyolefin polymerization performed at a low or high pressure, reduce the molecular weight of prepared polyolefin, easily control the molecular weight distribution thereof, narrow the molecular weight distribution thereof and prevent fouling in the preparation process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A supported metallocene catalyst, consisting essentially of:
   a carrier;
   a co-catalyst component 1 of organic metal compound containing aluminum;
   a metallocene compound represented by Chemical Formula 1, 2, or 3; and
   a co-catalyst component 2 of organic metal compound containing boron represented by Chemical Formula 8,
   wherein the co-catalyst component 1 of organic metal compound containing aluminum, the metallocene compound represented by Chemical Formula 1, 2, or 3, and the co-catalyst component 2 of organic metal compound containing boron represented by Chemical Formula 8 are sequentially supported on the carrier,

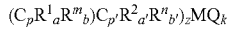
[Chemical Formula 1]

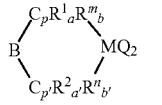
[Chemical Formula 2]

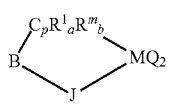
[Chemical Formula 3]

wherein in Chemical Formula 1, 2, or 3 each of Cp and Cp' is the same or different and is one selected from the group consisting of cyclopentadienyl, indenyl, 4,5,6,7-tetrahydro-1-indenyl and fluororenyl radical; each of $R^m$ and $R^n$ is the same or different and is hydrogen radical, alkyl radical of carbon number 1~20, cycloalkyl radical, aryl radical, alkenyl radical, alkylaryl radical, arylalkyl radical, arylalkenyl radical or alkylsilyl radical; each of $R^1$ and $R^2$ is the same or different and is hydrogen radical or hydrocarbyl radical of carbon number 1~6; a, a', b or b' is an integer of 1~4, respectively;

J is at least one selected from the group consisting of $NR^s$, O, $PR^s$ and S, and $R^s$ is a C1~C20 alkyl radical or a substituted C1~C20 alkyl radical;

B is a C1~C4 alkyl radical or at least one selected from the group consisting of hydrocarbyl radicals containing silicon, germanium, phosphorus, nitrogen, boron or aluminum;

M is a transition metal in group 4B, group 5B or group 6B of the periodic table;

Q is a halogen radical, or alkyl radical of carbon number 1~20, alkenyl radical, aryl radical, alkylaryl radical, arylalkyl radical; or alkylidene radical of carbon number 1~20, k is 2 or 3, z is 0 or 1, and when k is 3, z is 0;

wherein at least one of hydrogen radical presented in the $R^m$ or $R^n$ is replaced by the radical represented by Chemical Formula 4, 5 or 6:

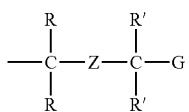
[Chemical Formula 4]

wherein in Chemical Formula 4,

Z is oxygen atom;

each of R and R' is the same or different and is hydrogen radical; alkyl radical of carbon number 1~20, cycloalkyl radical, aryl radical, alkenyl radical, alkylaryl radical, arylalkyl radical, arylalkenyl radical; two of R' is optionally connected to each other to form a ring;

G is alkoxy radical of carbon number 1~20, aryloxy, alkylthio, arylthio, phenyl or substituted phenyl, and is optionally connected to R' to form a ring;

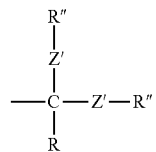
[Chemical Formula 5]

wherein in Chemical Formula 5,

Z' is oxygen atom;

each of R and R" is the same or different and is alkyl radical of carbon number 1~20, cycloalkyl radical, aryl radical, alkenyl radical, alkylaryl radical, arylalkyl radical, or arylalkenyl radical;

R and R", or two R"s is optionally connected to each other to form a ring;

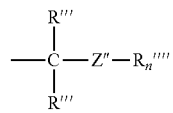
[Chemical Formula 6]

wherein in Chemical Formula 6,

Z" is oxygen, sulfur, nitrogen, phosphorus or arsenic atom;

R''' is the same or different hydrogen radical, alkyl radical of carbon number 1~40, cycloalkyl radical, aryl radical, alkenyl radical, alkylaryl radical, arylalkyl radical or arylalkenyl radical;

R"" is hydrogen radical, alkyl radical of carbon number 1~40, aryl radical, alkenyl radical, alkyaryl radical, alkylsilyl radical, arylsilyl radical, phenyl or substituted phenyl; n is 1,

[Chemical Formula 8]

In the above Chemical Formula 8, $T^+$ is a polyatomic ion having a valency of +1; B is boron in an oxidation state of +3 form; and Q is independently selected from the group consisting of hydride, dialkylamido, halide, alkoxide, aryloxide, hydrocarbyl, halocarbyl and halo-substituted-hydrocarbyl radical, respectively, and Q has less than 20 carbons.

2. The supported metallocene catalyst according to claim 1, wherein in Formula 4, R and R' are the same or different alkyl radical of carbon number 1~20 to each other; G is alkoxyl of carbon number 1~20; in Formula 5, R and R" are the same or different alkyl radical of carbon number 1~20 to each other; and in Formula 6, R''' is the same or different alkyl radical of carbon number 1~40 to each other; R"" is alkoxyl of carbon number 1~40.

3. The supported metallocene catalyst according to claim 1, wherein M is titanium, zirconium or hafnium, Q is halogen, and k is 2.

4. The supported metallocene catalyst according to claim 1, wherein the compound represented by Chemical Formula 1 is $[A-O-(CH_2)_a-C_5H_4]_2ZrCl_2$ or $[A-O-(CH_2)_a-C_9H_6]ZrCl_3$, in which a is an integer of 4~8, and A is one selected from the group consisting of methoxymethyl, t-butoxymethyl, tetrahydropyranyl, tetrahydrofuranyl, 1-ethoxyethyl, 1-methyl-1-methoxyethyl and t-butyl.

5. The supported metallocene catalyst according to claim 1, wherein the support is dried at 200 to 800° C.

6. The supported metallocene catalyst according to claim 1, wherein the carrier is one or more selected from the group consisting of silica, silica-alumina, and silica-magnesia.

7. The supported metallocene catalyst according to claim 1, wherein the co-catalyst is the compound represented by Chemical Formula 7:

$$—[Al(R^3)—O]_n—$$ [Chemical Formula 7]

wherein, in the above Chemical Formula 7,
$R^3$ is the same or different halogen radical, hydrocarbyl radical of carbon number 1 to 20 or hydrocarbyl radical of carbon number 1 to 20 substituted with halogen to each other, and n is an integer of above 2.

8. The supported metallocene catalyst according to claim 7, wherein the compound represented by Chemical Formula 7 is one selected from the group consisting of methylaluminoxane (MAO), ethylaluminoxane, isobutylaluminoxane, and butylaluminoxane.

9. The supported metallocene catalyst according to claim 1, wherein the co-catalyst 2 is one or more selected from the group consisting of trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium) tetraphenylborate, trimethylammonium tetrakis(pentafluorophenyl)borate, methylditetradecylammonium tetrakis (pentafluorophenyl)borate, methyldioctadecylammonium tetrakis(pentafluorophenyl)borate, triethylammonium tetrakis(pentafluorophenyl)borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl)borate, N,N-dimethylanilinium tetrakis (pentafluorophenyl)borate, N,N-diethylanilinium tetrakis (pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-(2,4,6-trimethylanilinium)tetrakis-(2,3,4,6-tetrafluorophenyl)borate, dioctadecylammonium tetrakis (pentafluorophenyl)borate, ditetradecylammonium tetrakis (pentafluorophenyl)borate, dicyclohexylammonium tetrakis (pentafluorophenyl)borate, triphenylphosphonium tetrakis (pentafluorophenyl)borate, methyloctadecylphosphonium tetrakis(pentafluorophenyl)borate, tri(2,6-dimethylphenyl) phosphonium tetrakis(pentafluorophenyl)borate, methyldi (octadecyl)ammonium tetrakis(pentafluorophenyl)borate, and methyldi(tetradecyl)-ammonium tetrakis (pentafluorophenyl)borate.

10. The supported metallocene catalyst according to claim 1, wherein the supported amount of the co-catalyst 2 is 0.1 to 10,000 mole based on 1 mole of the transition metal that is supported in the metallocene compound, by the boron contained in the co-catalyst 2.

11. The supported metallocene catalyst according to claim 1, wherein the compound represented by Chemical Formula 2 is [A-O—(CH$_2$)$_a$—C$_5$H$_4$]C(CH$_3$)$_2$[C$_{13}$H$_8$]ZrCl$_2$, [A-O—(CH$_2$)$_a$—C$_5$H$_4$]Si(CH$_3$)$_2$[Cl$_3$H$_8$]ZrCl$_2$, [C$_5$H$_5$]C(CH$_3$)(A-O—(CH$_2$)$_a$)[Cl$_3$H$_8$]ZrCl$_2$ or [C$_5$H$_5$]Si(CH$_3$)(A-O—(CH$_2$)$_a$)[C$_{13}$H$_8$]ZrCl$_2$, in which a is an integer of 4~8, and A is one selected from the group consisting of methoxymethyl, t-butoxymethyl, tetrahydropranyl, tetrahydrofuranyl, 1-ethoxyethyl, 1-methyl-l-methoxyethyl and t-butyl.

12. The supported metallocene catalyst according to claim 1, wherein the compound represented by Chemical Formula 3 is [(A'-D-(CH$_2$)$_a$)](CH$_3$)X(C$_5$Me$_4$)(NCMe$_3$)] TiCl$_2$, in which X is methylene, ethylene or silicon, D is oxygen or nitrogen atom, and A' is one selected from the group consisting of hydrogen, alkyl of carbon number 1~20, alkenyl, aryl, alkylaryl, arylalkyl, alkylsilyl, arylsilyl, methoxymethyl, t-butoxymethyl, tetrahydropranyl, tetrahydrofuranyl, 1-ethoxyethyl, 1-methyl-l-methoxyethyl and t-butyl.

\* \* \* \* \*